April 7, 1953      G. R. WELDEN      2,634,137
FOLDING BABY CARRIAGE
Filed May 26, 1949
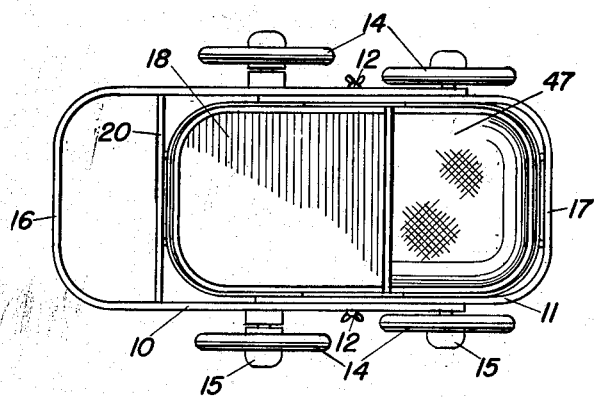
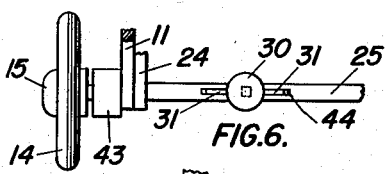
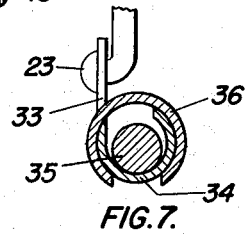
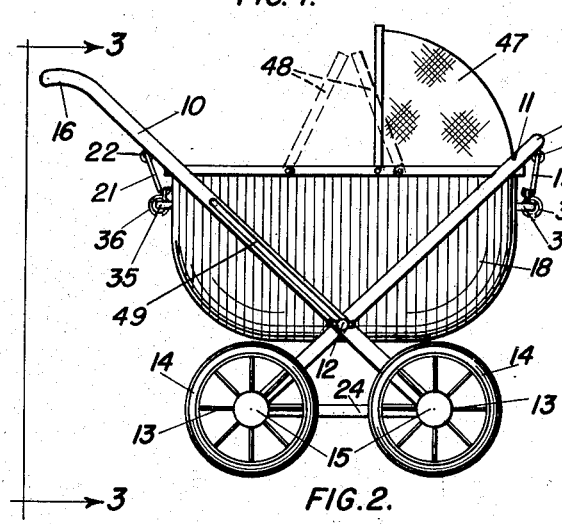
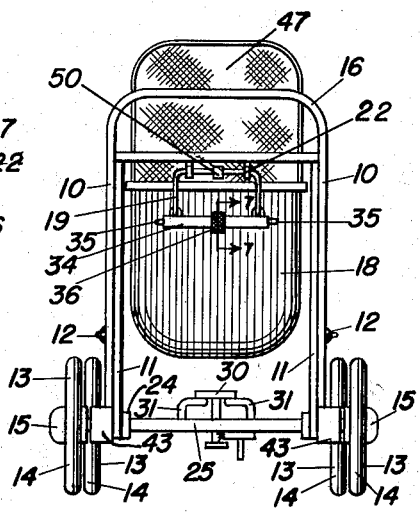
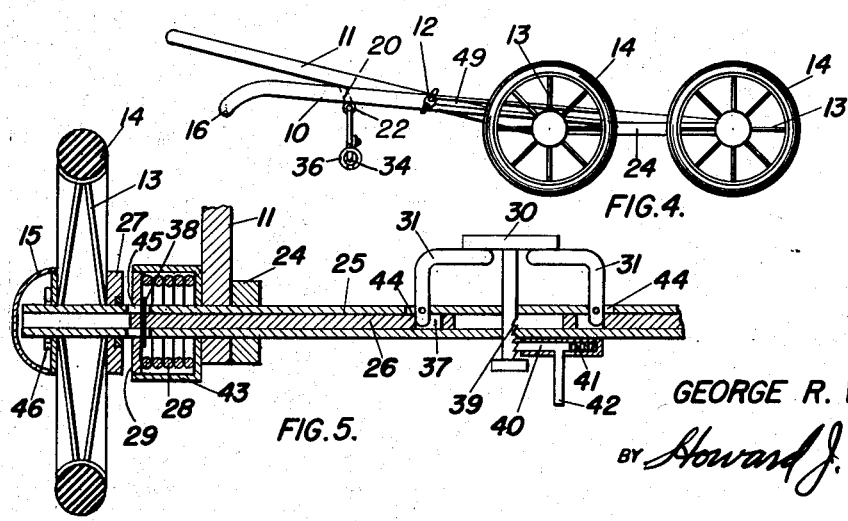
INVENTOR.
GEORGE R. WELDEN.
BY Howard J. Whelan,
ATTORNEY.

UNITED STATES PATENT OFFICE 2,634,137

FOLDING BABY CARRIAGE

George R. Welden, Baltimore, Md.

Application May 26, 1949, Serial No. 95,541

2 Claims. (Cl. 280—36)

This invention refers to vehicles propelled by hand, and more particularly to those belonging to the class known as folding baby carriages.

It is an object of this invention to provide a new and improved baby carriage of the folding type that will avoid one or more of the disadvantages and limitations of the prior art.

Another object of the invention is to provide a new and improved collapsible baby carriage that will be simple in construction but effective in operation and capable of being folded into compact form.

Still another object of the invention is to provide a new and improved collapsible frame for a baby carriage that will permit the facile installation or removal of the body part or basket of the carriage therefrom.

A further object of this invention is to provide a new and improved baby carriage frame or chassis that will be convenient to handle and operate and will enable the user to adjust it and use it for other purposes. Also to provide a carriage that will lift over curbs easily.

A still further object of the invention is to provide a collapsible baby carriage frame with a removable basket for carrying into an automobile or other conveyance.

A further object of the present invention is to provide a self aligning suspended basket which will not fall when the suspending sling breaks.

Other objects will become apparent as the invention is more fully described.

While various types of collapsible baby carriages have been developed, and have been relatively satisfactory, they have not in general permitted the use of a basket of conventional form that could be readily removed or replaced in the chassis, without disturbing the infant therein. In this invention it is made practical to remove the basket from the frame and carry it to another location without disturbing the general position of the parts of the frame or the infant. At the same time the basket is resiliently supported to make it comfortable and safe for the infant.

For an adequate presentation of the invention, its objects and the principles thereof, reference is made to the accompanying drawings, which indicate a particular form of the invention, by way of example. The drawings in conjunction with the following description outline this form in detail while the claims indicate the scope of the invention.

In the drawings:

Figure 1 is a plan view of a baby carriage embodying this invention;

Figure 2 is a side elevation of Figure 1;

Figure 3 is an end view looking in the direction of arrows 3—3 of Figure 2;

Figure 4 is a side elevation of the frame in folded position, without the basket;

Figure 5 is an enlarged sectional view taken through the wheel and shaft to show the brake mechanism;

Figure 6 is a plan view of the wheel shaft and brake; and

Figure 7 is a sectional view taken along line 7—7 of Figure 3.

Similar portions of the drawings are designated by the same reference numerals.

The particular baby carriage indicated in the drawings, consists of a frame including a pair of cross-legs 10 and 11 on each side fastening together at a screw pin 12 on which they hinge, to collapse from an X-form to a relatively straight outline. The lower ends of the legs are adapted for shafts having hub caps 15 which shafts support baby carriage wheels 13 of conventional design, and preferably with tires 14 mounted thereon. The upper end portion of the cross-leg 10 is extended and bent to a handle contour 16, while that of the cross leg 11 is limited to a length sufficient to provide for a transverse bar 17 on which a basket 18 is suspended by a resilient cable 19. The bar 17 is placed at a suitable level when the frame is open to support the basket at that end above the wheels 13, as indicated in Figure 2. A transverse bar 20 likewise is used on the cross-legs 10 on the handle side of the carriage, and suspends the basket 18 from that end, with another resilient cable 21. The cables 19 and 21 are provided with stops 50 and are looped through eyelets 22 fastened to the side of each bar 17 and 20 to provide more flexibility and adjustment than would be possible if their supporting portions were more rigidly secured. The cables have hooks or ends 23 that fasten to eyes 33 in slotted tubes 34. The basket is provided with handle 35 that rest in the slotted tubes 34 and is retained therein by a rotatable collar 36, to support the basket 18 as shown. The wheels 13 are held in line and position by the horizontal rods 24 which are attached by their ends, to the axles 25 of the wheels. Brakes are installed on the back wheels of the carriage for controlling its movement and preventing it from running away while unattended. These brakes are placed between the wheels 13 and the frame, and include a friction plate 27 of disc-like outline rigidly mounted on the wheel, an intervening coil spring 28 of the tension type having one end secured to a plate 29, slidable on rod 26, such as by welding, and having its opposite end abutting the end wall of a casing 43. The plates 27 and 29 are brought together by a treadle 30 pressing down on toggle arms 31 and forcing rods 26 outwardly to induce contact between the plates. The wheels 13 are held against movement on the shaft to enable this to be done.

The rods 26 are slotted at 37 to allow the end of the toggle arms 31 to move therein. The opposite end of the rods 26 are provided with pins 38 that move the plate 29 towards the plate 27 when the treadle arms 30 are depressed. A suitable slot in axles 25 allows for this movement as explained further. The treadle 30 is provided with teeth 39 engaged by a pawl 40 tensioned by spring 41 to hold the friction plates in locked position. To release the brakes the tripper 42 is pushed sidewise to withdraw the pawl 40 from the teeth 39, so the treadle 30 will return to normal position with the friction plates separated. Casings 43 cover the springs 28. The axles 25 are provided with slots 44 for toggles 31 and slots 45 for pins 38. The wheels 13 are preferably held to the axles 25 by cotter pins 46.

The use of the carriage in actual service, requires that the cables 19 and 21 and tubes 34 be hooked to the handle 35 of the basket which is pended therefrom and the basket is resiliently held. The infant is placed in the basket. The basket may be removed at any time with the baby in it and placed elsewhere. Then the frame may be jack-knifed together and folded compactly for storage. It is preferred that the basket be of the form indicated and provided with a hood 47 adapted for folding. A slot 49 in the legs 10 allows the pin 12 to slide during folding. Handles 48 are pivotally attached to basket 18 for carrying purposes.

While but one general form of the invention is shown in the drawings and described in the specifications, it is not desired to limit this application for patent to this particular form, as it is appreciated that other forms of construction could be made that would use the same principles and come within the scope of the appended claims.

Having thus described the invention, what is claimed is:

1. A baby carriage comprising a basket, a frame composed of a pair of parallel X-shaped members on each longitudinal side of the basket, a handle at the front of the basket integral with and connecting the upper ends of two parallel members of said X-shaped members, a transverse bar between the handle and the forward end of the basket having its ends secured to the aforesaid two parallel members, a transverse bar at the rear of the basket connecting the other upper ends of said X-shaped members, quick-detachable means for flexibly connecting both ends of the basket to the aforesaid transverse bars, respectively, a pair of axles connecting the lower ends of said members in parallel relation, a pair of wheels mounted on each axle, a screw pin connecting each pair of members forming said X-shaped members, one of each pair of said members having a slot therein to guide said pin whereby, upon removal of the basket from the frame, both pairs of parallel X-shaped members are foldable about the pins to one and the same side of the wheels.

2. A baby carriage as set forth in claim 1, means for maintaining the wheels in spaced relation when the carriage is in normal operation and when in folded position, said means comprising a pair of horizontal rods secured in parallel relation on said axles.

GEORGE R. WELDEN.

REFERENCES CITED

The following references are of record in the file of this patent:

UNITED STATES PATENTS

| Number | Name | Date |
|---|---|---|
| 1,085,573 | Adams | Jan. 27, 1914 |
| 1,180,235 | Buddy | Apr. 18, 1916 |
| 1,224,525 | Froman | May 1, 1917 |
| 1,331,513 | Lindberg | Feb. 24, 1920 |
| 1,355,039 | Gibson | Oct. 5, 1920 |
| 1,721,178 | Collier et al. | July 16, 1929 |
| 1,782,742 | Perlmutter | Nov. 25, 1930 |
| 2,225,999 | Kroll et al. | Dec. 24, 1940 |
| 2,292,132 | Kroll et al. | Aug. 4, 1942 |
| 2,296,193 | Siebert | Sept. 15, 1942 |
| 2,482,230 | Welsh | Sept. 20, 1949 |

FOREIGN PATENTS

| Number | Country | Date |
|---|---|---|
| 810,833 | France | Jan. 6, 1937 |